US 6,563,649 B2

(12) United States Patent
Furuya (10) Patent No.: US 6,563,649 B2
(45) Date of Patent: May 13, 2003

(54) DISPLAY UNIT FOR VEHICLES (75) Inventor: Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 86 days.

(21) Appl. No.: 09/921,788

(22) Filed: Aug. 6, 2001

(65) Prior Publication Data
US 2002/0021500 A1 Feb. 21, 2002

(30) Foreign Application Priority Data
Aug. 8, 2000 (JP) ........................................ 2000-239429

(51) Int. Cl.⁷ ............................ G02B 27/14; G09G 5/00
(52) U.S. Cl. ............................ 359/630; 359/625; 345/7
(58) Field of Search ................................ 359/625, 627, 359/629, 630, 640, 495, 496; 345/7, 8, 9, 10; 349/57

(56) References Cited
U.S. PATENT DOCUMENTS

| 5,291,184 A | | 3/1994 | Iino ............................. 345/7 |
| 5,502,456 A | | 3/1996 | Korenaga et al. ............... 345/9 |
| 5,504,598 A | * | 4/1996 | Sprague et al. ................. 359/41 |
| 5,526,184 A | * | 6/1996 | Tokuhashi et al. ............. 359/630 |
| 6,262,848 B1 | * | 7/2001 | Anderson et al. ............. 359/630 |
| 6,327,084 B1 | * | 12/2001 | Nishikawa et al. ........... 359/487 |
| 2002/0080495 A1 | * | 6/2002 | Anderson ..................... 359/630 |
| 2002/0097196 A1 | * | 7/2002 | Furuya et al. ................. 349/57 |

FOREIGN PATENT DOCUMENTS

JP 4-85370 7/1992

* cited by examiner

Primary Examiner—Hung Xuan Dang
Assistant Examiner—Gary O'Neill
(74) Attorney, Agent, or Firm—Armstrong, Westerman & Hattori, LLP (57) ABSTRACT The object is to display an image projected by a display device, installed in a vehicle dashboard, for displaying an information data in the optimum field of vision for a driver and to make a driver recognize visually.

Projected light (image) by a liquid crystal display 12 is polarized (horizontal polarization) by a polarizing plate 12a mounted on the surface of the liquid crystal display 12 and reaches the first polarizing plate 9 through a prism 11. Since the polarizing direction of the first polarizing plate 9 is perpendicular to that of the polarizing plate 12a, the projected image is reflected toward a eye position 6 by the first polarizing plate 9. External incident light on the area AR1, limited by the first polarizing plate 9, is polarized (vertical polarization) by passing the first polarizing plate 9. When the vertical polarized external light goes through the prism 11, the external light is attenuated by the horizontally polarizing plate 12a in front of the liquid crystal display 12 and then the external incident light is cut off on the liquid crystal display.

5 Claims, 7 Drawing Sheets

DISPLAY UNIT FOR VEHICLES

BACKGROUND OF THE INVENTION

1. Field of the Invention

This invention relates to a display unit for vehicles, for displaying an image by an information display device, installed in a vehicle dashboard, to make a driver recognize visually, in an optimum field of vision for a driver.

2. Description of the Related Art

Figure 8A:
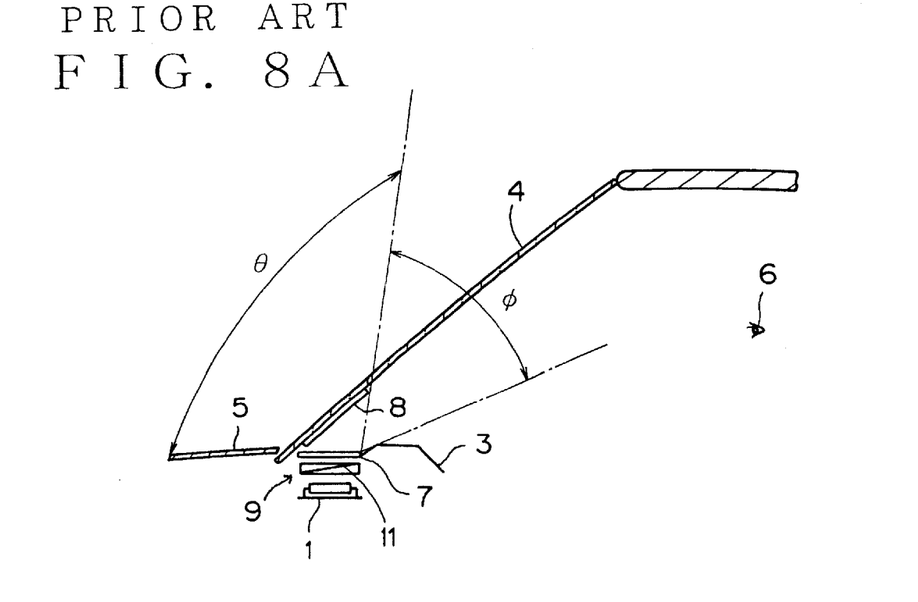
FIGS. 8A, 8B are structural drawings of a display unit for vehicles by prior art.

There is already such a display unit for a vehicle by prior art like one example, described in J.U.M. Application Laid-open No. H4-85370. As shown in FIG. 8A, this referred display unit has a display device 1 (liquid crystal display) for information data, installed in a dashboard 3 of a vehicle, and a displayed image by the display device 1 is reflected by a reflecting member placed under a windshield 4 to make a driver recognize visually.

This reflecting member is composed of a second polarizing plate 8. The second polarizing plate is placed under a windshield 4 and upper than a horizontal plane of a hood 5. A first polarizing plate 7, a polarizing direction of which is perpendicular to that of the second polarizing plate 8, is placed between the second polarizing plate 8 and the display device 1.

In this structure, a projected image by the display device 1 is reflected toward a driver's eye position 6 by the second polarizing plate 8, passing through a prism 11 and the first polarizing plate 7.

External light, incident on the windshield 4 within range of angle θ, cannot reach to the display device 1 through the prism 11 and then does not deteriorate display device elements by lighting washout because the external light is shaded by the first polarizing plate 7 and the second polarizing plate 8 those polarizing directions cross perpendicularly to each other.

Figure 8B:
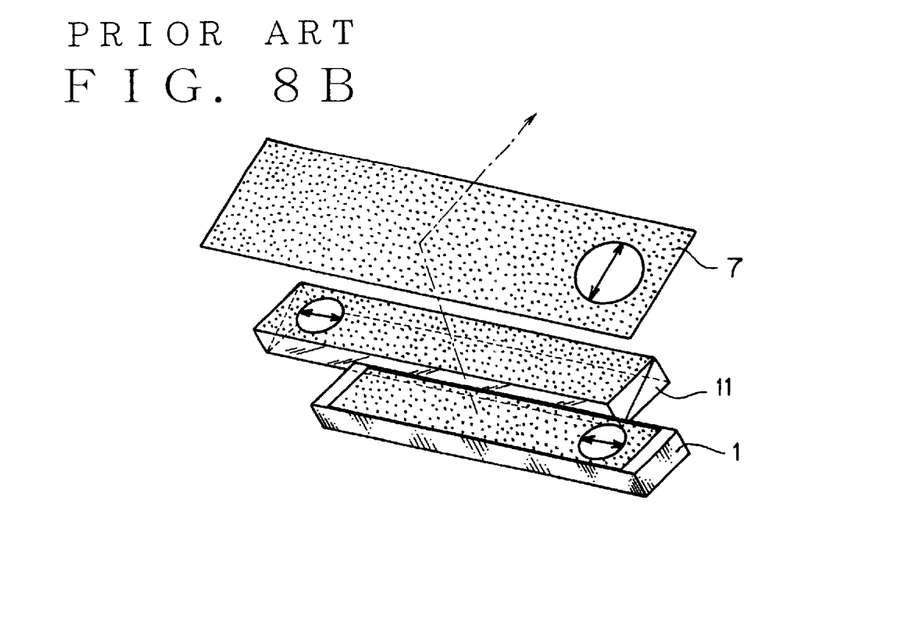

In a display unit for vehicles by prior art, the structure protects external incident light as mentioned above. There are, however, some display devices which project polarized light by themselves. A liquid crystal display, composing the display device 1 as shown in FIG. 8B, has a polarizing plate 1a on the top surface for required property and then, a projected light by a liquid crystal display is polarized by the polarizing plate 1a. If this polarizing direction is perpendicular to that of the polarizing plate 11a mounted on the prism 11, a projected light by the liquid crystal display can transmit through the prism, but its light power is attenuated by the polarizing plate 11a and then its display brightness remarkably goes down.

In the other hand, if adjusting the polarizing direction of the second polarizing plate for external light to the polarizing direction of a liquid crystal display, the second polarizing plate reflects vertically polarized light a little and then image quality is attenuated by bad influence of the reflective property.

SUMMARY OF THE INVENTION

This invention has been accomplished to overcome the above drawbacks and an object of this invention is to provide a display unit for vehicles, displaying a see-through image with high brightness and no ghost image at a better viewing position where can be recognized visually.

In a display unit for vehicles, according to this invention, comprising a display device for displaying information installed in a dashboard and projecting a reflective display image of the display device by a reflecting member placed under a windshield to make a driver recognize visually, the reflecting member has a prism placed above the display device, and a first polarizing means for reflecting the displayed image of the display device passed through the prism, toward a direction of a driver's field of vision, and at least one of the display device or the prism has, on a surface thereof, a second polarizing means, a polarizing direction of which is perpendicular to that of the first polarizing means. The projected image by the display device is polarized perpendicularly to the polarizing direction of the first polarizing means by the second polarizing means, and inputted on the first polarizing means and reflected toward a driver's field of vision. Since external incident light is polarized perpendicularly to the polarizing direction of the second polarizing means by the first polarizing means and external light incident on the prism is total reflected in the prism, the external light can be cut off into the display device.

The reflecting member, according to this invention, has the second polarizing means on the surface of the display device and then the projected image by the display device is polarized perpendicularly to the polarizing direction of the first polarizing means by the second polarizing means. The polarized image is projected into the first polarizing means through the prism. Since external incident light, polarized by the first polarizing means and going into the prism, is attenuated by the second polarizing means which polarizing direction is perpendicular to the polarizing direction of the first polarizing means and is total reflected in the prism, the external light can be cut off into the display device.

The reflecting means, according to this invention, has the second polarizing means on the surface of the prism and then the projected image by the display device is polarized perpendicularly to the polarizing direction of the first polarizing means by the second polarizing means when passing the prism. The polarized image is projected into the first polarizing means. Since external incident light, polarized by the first polarizing means and going into the second polarizing means on the prism surface, is attenuated by the second polarizing means which polarizing direction is perpendicular to the polarizing direction of the first polarizing means and is total reflected in the prism, the external light can be cut off into the display device.

In a display unit for vehicles, according to this invention, comprising a display device, installed in a dashboard, for displaying information data and a reflecting member, placed under a windshield, to make a driver recognize visually by reflecting displayed image of the display device, the reflecting member has a selfoc lens having prescribed limit incident angle placed over the display device, and a first polarizing means for reflecting the image of the display device, passed through the selfoc lens, toward a direction of a driver's field of vision, and the selfoc lens has a second polarizing means on surface, which polarizing direction is perpendicular to that of the first polarizing means. Since external incident light is polarized perpendicular to the polarizing direction of the second polarizing means by the first polarizing means, and is absorbed by absorbing layer out of light transmitting area of the selfoc lens, the external light, incident on the selfoc lens, is cut off to the display device.

The selfoc lens according to this invention, which limit light incident angle covers the reflecting area of the first polarizing means, has total external light solution to cut off external incident light on the display device, since external light incident on inside area of the limit incident angle, polarized perpendicularly to the polarizing direction of the second polarizing means by the first polarizing means, is attenuated by the second polarizing means and external incident light from the outside area of the limit incident angle is absorbed by absorbing layer.

EFFECT OF INVENTION

According to this invention, projected image by a display device is polarized perpendicularly to the polarizing direction of the first polarizing means by the second polarizing means and its image is inputted on the first polarizing means to be reflected toward a driver's field of vision. Further, external incident light is polarized perpendicularly to the polarizing direction of the second polarizing means by the first polarizing means and external incident light on the prism is totally reflected in the prism. Then, since external incident light on the display device is cut off, high brightness image can be given.

According to this invention, projected image by a display device is polarized perpendicularly to the polarizing direction of the first polarizing means by the second polarizing means and its image is inputted on the first polarizing means through the prism. Further, external incident light, polarized by the first polarizing means and passing through the prism, is attenuated by the second polarizing means which polarizing direction is perpendicular and external incident light on the prism is totally reflected in the prism. Then, since external incident light on the display device is cut off, the image is reflected efficiently by the first polarizing means and high brightness image can be given.

According to this invention; projected image by a display device, passing through the prism, is polarized perpendicularly to the polarizing direction of the first polarizing means by the second polarizing means and its image is inputted on the first polarizing means. External incident light, polarized by the first polarizing means and going on the second polarizing means on the prism surface, is attenuated by the second polarizing means which polarizing direction is perpendicular and external incident light on the prism is totally reflected in the prism. Then, since external incident light on the display device is cut off and unexpected external incident light on the prism is prevented, clear image can be given.

According to this invention, image passing through the selfoc lens after projected by a display device is polarized perpendicularly to the polarizing direction of the first polarizing means by the second polarizing means and its image is inputted on the first polarizing means to be reflected toward a driver's field of vision. Further, external incident light is polarized perpendicularly to polarizing direction of the second polarizing means by the first polarizing means and external incident light on the selfoc lens is absorbed by the absorbing layer out of light transmitting area. Then, since external incident light on the display device is cut off, high quality image with higher display height can be given in a smaller size compared with using prism.

In the selfoc lens according to this invention, the light aperture angle covers the reflecting area of the first polarizing means and external incident light on the aperture angle area is polarized perpendicularly to the polarizing direction of the second polarizing means by the first polarizing means and is attenuated by the second polarizing means. And external incident light over the aperture angle is absorbed by the absorbing layer. Then, since external incident light on the display device is cut off, thus total control for external can be done.

DESCRIPTION OF THE PREFERRED EMBODIMENT

Figure 1A:
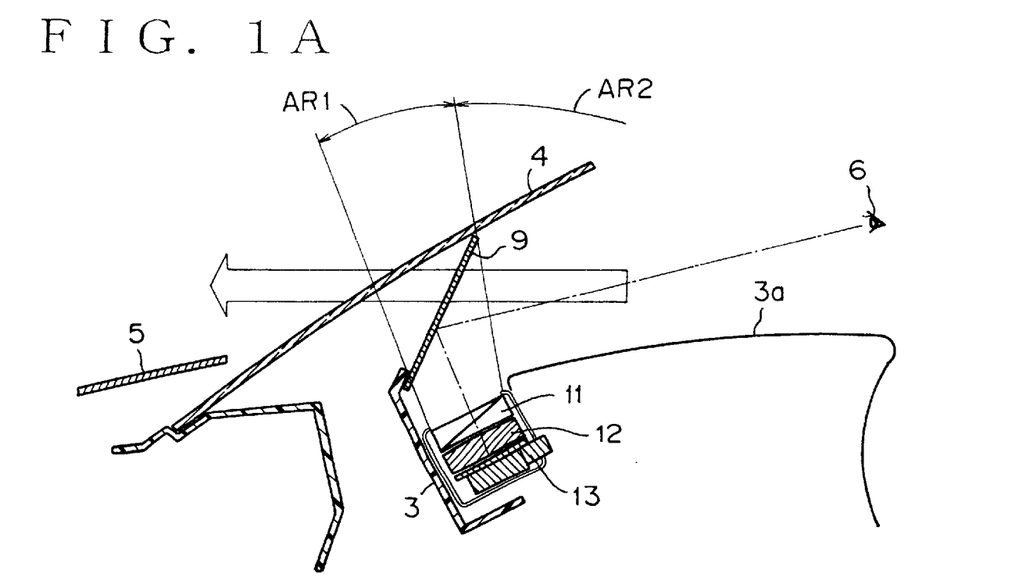
FIGS. 1A, 1B, 1C are structural drawings of the first embodiment of a display unit for vehicles according to this invention.

The first embodiment of a display unit for vehicles according to this invention will now be described with reference to the attached drawings. FIG. 1A is a sectional view of main area of the embodiment according to this invention.

In FIG. 1A, the same symbols in FIG. 8A indicate the same parts or corresponding parts. In FIG. 1A, a first polarizing plate 9, as a reflector, is installed on a windshield and placed with prescribed angle inside a front windshield which polarizes external light. The first polarizing plate 9 is connected at a bottom edge to a dashboard 3 and contacts at a top edge to the front windshield 4 with prescribed angle.

The dashboard 3 is provided inside with a display device 12 (liquid crystal display) displaying image information data of navigation system or the like, and a circuit 13 for driving liquid crystal display, placed behind the liquid crystal display 12, and a prism 11 for projecting the image, displayed by the liquid crystal display 12 on the first polarizing plate 9 through itself. The prism 11 is comprised of two prisms those are assembled as rectangular solid shape to contact slop of prisms to each other.

An image projected on the polarizing plate 9 through the prism 11 is reflected perpendicularly to incident angle, for direction of a driver's eye position 6.

Figure 1B:
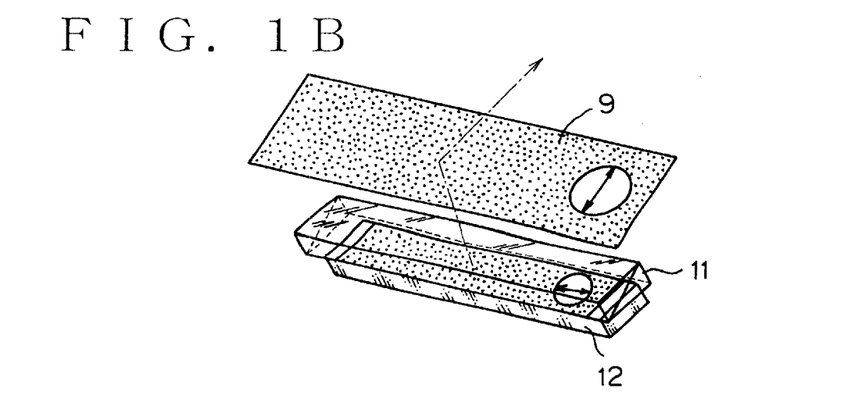
Figure 1C:
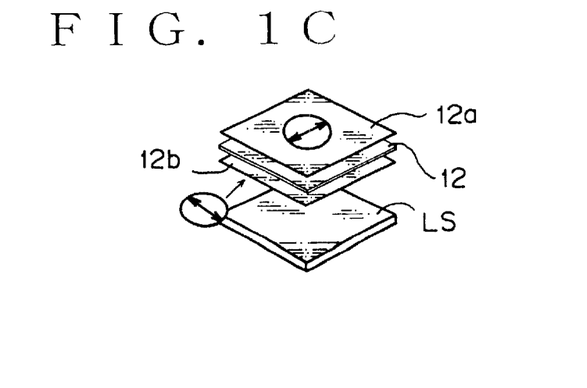

As shown in FIG. 1C, there are provided with a light source LS for a back-light on the bottom of the liquid crystal 12, a polarizing plate 12b between the light source LS and the liquid crystal display 12, a polarizing plate 12a on the top surface of the liquid crystal display 12. The polarizing directions of the polarizing plate 12a and 12b cross perpendicularly to each other. As shown in FIG. 1B, the polarizing directions of the polarizing plate 12a and the first polarizing plate 9 are provided to cross perpendicularly to each other.

The polarizing plate 12a on the surface of the liquid crystal display 12 performs for polarizing as same as a polarizing plate on the surface of a usual prism 11, refer to FIG. 8B. Further, the polarizing direction of the polarizing plate 12a is provided to cross perpendicularly to the polarizing directions of the front windshield 4 and the first polarizing plate 9 and to perform for the polarizing direction on the surface of the liquid crystal display which internal structure is adjusted for the polarizing direction.

Acting of this embodiment of a display unit for vehicles will be described as follows.

In the structure on polarizing directions as mentioned above, a light (an image), projected from the liquid crystal display 12, is polarized (horizontal polarization) by the polarizing plate 12a placed on the surface of the liquid crystal display and reaches the first polarizing plate 9 through the prism 11. Since the polarizing direction of the first polarizing plate 9 is perpendicular to that of the polarizing plate 12a, the image can be reflected perpendicularly toward the eye position 6 without any reflecting loss in the first polarizing plate 9.

Thus, providing the same function of a polarizing plate on the surface of the prism 11 to the polarizing plate 12a on the surface of a liquid crystal display can reduce one polarizing plate and eliminate transmitting power loss of one polarizing plate and then display a higher brightness image.

Control of external incident light to inside of a car will be described as follows.

In the area AR1 where external incident light is limited by the first polarizing plate 9, external light is polarized (vertical polarized light) by passing through the first polarizing plate 9. When vertical polarized light goes into the liquid crystal display 12 through the prism 11, the light is attenuated by near side horizontal polarizing plate 12a on the liquid crystal display 12 and then external incident light is cut off to the liquid crystal display 12.

In the area AR2 where external incident light is limited by the prism 11, out of the area AR1 where external incident light is limited by the first polarizing plate 9, by means of providing total reflection range on internal reflection of the prism, external incident light is totally reflected in a half part of the prism 11 which is placed on the surface of the liquid crystal display 12 and can not reach the liquid crystal display 12.

In the first embodiment of a display unit for vehicles, as mentioned above, the polarizing plate 12a on the liquid crystal display surface performs its function instead of the polarizing plate on the surface of the prism 11. Conversely, the polarizing plate 12a on the surface of the prism 11 can also perform its function instead of the polarizing plate 12a on the liquid crystal display surface.

Figures 2A, 2B:
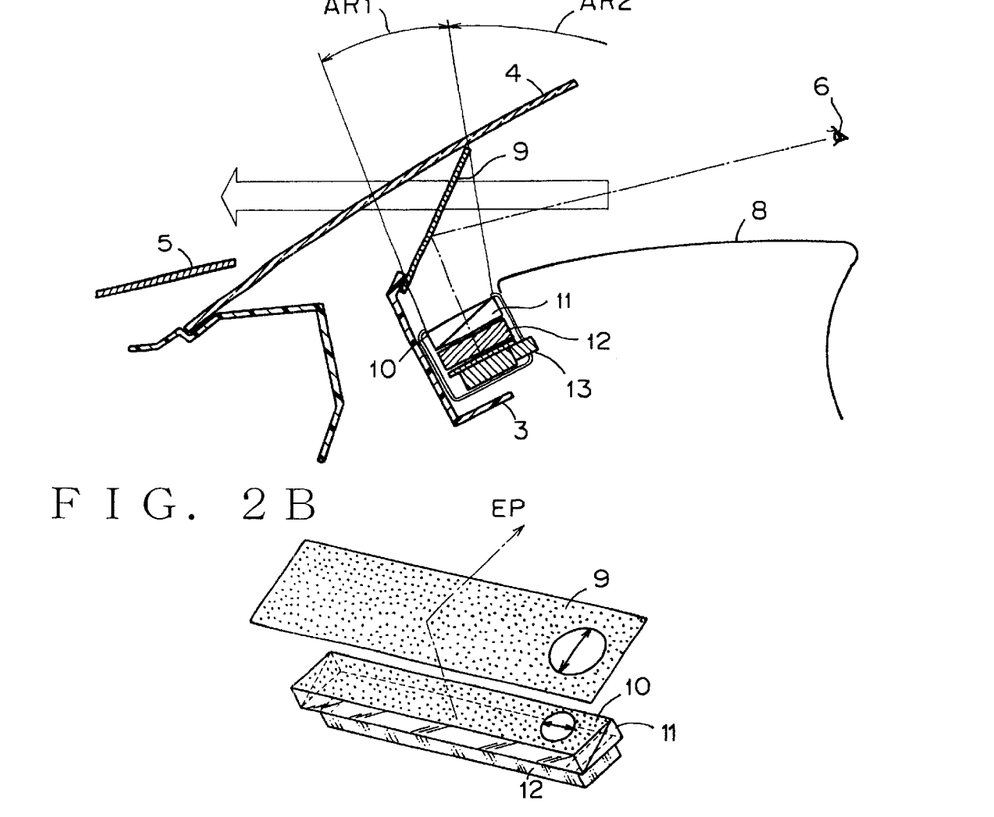
FIGS. 2A, 2B, 2C are structural drawings of the second embodiment of a display unit for vehicles according to this invention.
Figure 2C:
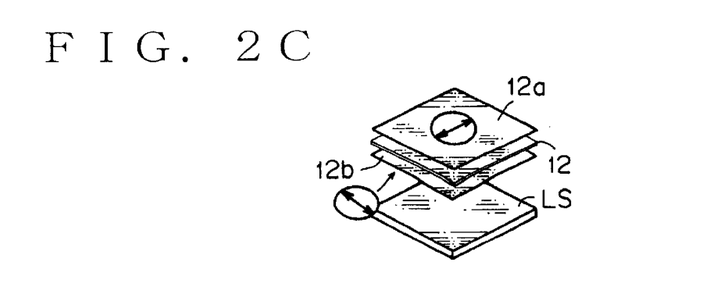

FIG. 2A shows a sectional view of main area on the second embodiment of a display unit for vehicles according to this invention. In this FIG. 2A, the same symbols in FIG. 1A indicate the same parts or corresponding parts. In the drawing, 10 is a second polarizing plate. The second polarizing plate 10, as shown in FIG. 2B, replaces the polarizing plate 12a covering on the whole surface of the liquid crystal display 12 with it on the surface of the prism 11 in previous embodiment. Then, in this embodiment, the liquid crystal display 12 does not have the polarizing plate 12a on the surface.

The second embodiment of a display unit for vehicles according to this invention will be described as follows.

An image projected by the liquid crystal display 12 passes through the prism 11. Just after passing the prism 11, a light, going into the liquid crystal display 12 from the light source LS, is polarized by a polarizing plate 12b mounted on the bottom surface of the liquid crystal display 12 and twisted by a liquid crystal because of no polarizing plate 12a on the surface of the liquid crystal display 12. Since no polarizing plate 12a for correcting its twisted condition is mounted on the surface of the liquid crystal display 12, the light passing through the liquid crystal display 12 does not display required final image.

The light through the prism 11, after passing through the liquid crystal display 12, is polarized to be required proper image by the second polarizing plate 10 mounted on the surface of the prism 11 and goes into the first polarizing plate 9. Its incident light image is reflected toward the eye position 6 and high brightness image is given, since the polarizing directions of the first polarizing plate 9 and the incident light image cross perpendicularly to each other.

Since the second polarizing plate 10 is mounted on the surface of the prism 11 as mentioned above, external light, which is polarized perpendicularly (vertical polarization) to polarizing direction of the second polarizing plate 10 by the first polarizing plate 9, can be attenuated by the second polarizing plate 10 when going into the prism 11. When looking the polarizing plate 9 from the eye position 6, a clear image is given because there is no other images (unexpected reflection in the prism) with the exception of displayed images.

Control of external incident light to inside of a car will be described as follows.

In the area AR1 where external incident light is limited by the first polarizing plate 9, external light is polarized (vertical polarization) through the first polarizing plate 9. When the vertical polarized light goes into the liquid crystal display 12 through the prism 11, the light is attenuated by the second polarizing plate 10, which polarizing direction crosses perpendicularly to the vertical polarization, in front of the prism 11.

In the area AR2 where external incident light is limited by the prism, out of the area AR1 where external incident light is limited by the first polarizing plate 9, by means of providing total reflection range on internal reflection of the prism, external incident light is totally reflected in the prism 11 in front of the liquid crystal display 12 and can not reach the liquid crystal display 12.

Furthermore, since external light is attenuated in front of the prism to prevent its external incident light go into the prism, high quality images can be given without bad effects by ghost image or image distortion for displayed images on the prism 11.

In above the first and second embodiment, protecting external incident light on the liquid crystal display is done by total reflection in the prism and shield effect with two polarizing plates. In the third embodiment, a selfoc lens array, which has the second polarizing plate 10 on the surface as same one in the second embodiment, is placed instead of the prism 11.

Figure 3A:
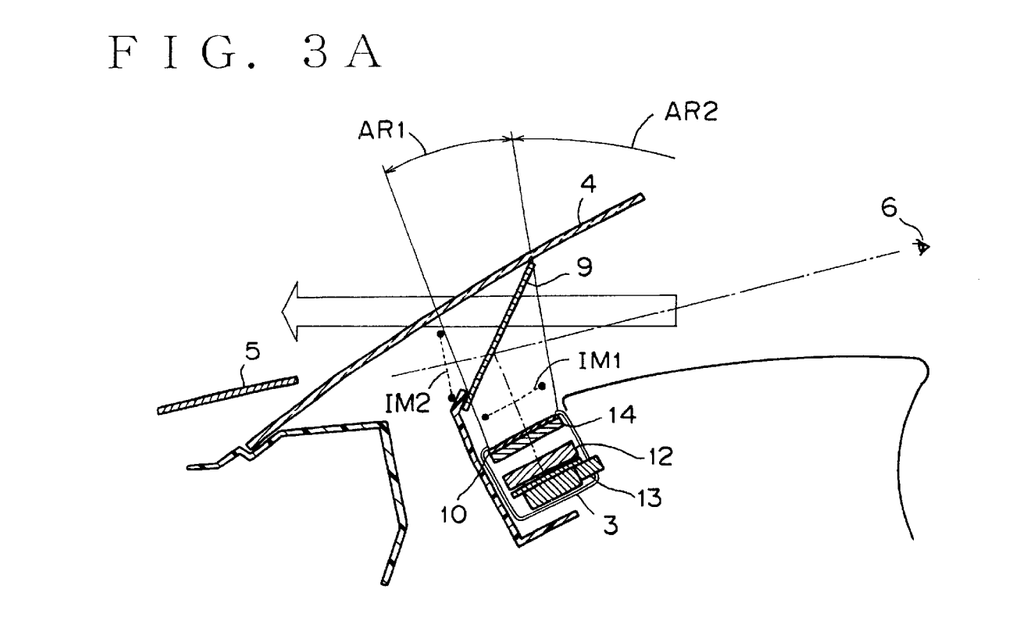
FIGS. 3A, 3B are structural drawings of the third embodiment of a display unit for vehicles according to this invention.

FIG. 3A shows a sectional view of main area on the third embodiment of a display unit for vehicles according to this invention. In this FIG. 3A, the same symbols in FIG. 2A indicate the same parts or corresponding parts. In the drawing, 14 is a selfoc lens array which has the second polarizing plate 10 on an image projecting side surface of the lens array, describing more detail later.

Figure 4:
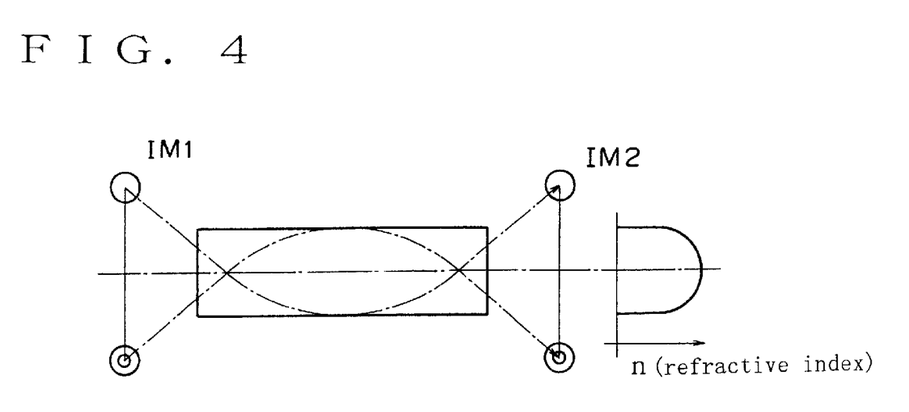
FIG. 4 is a drawing for explaining the optical property of the selfoc lens in the third embodiment of a display unit for vehicles according to this invention.

A selfoc lens is given by bundling plural graded-index type optical fibers, having refractive index range as shown in FIG. 4, with absorbing layer between each fiber. When reflected light on objects or transmitted light through objects by projecting light from a light source goes into a selfoc lens, the light meanders in the selfoc lens to be deflected toward higher refractive index area of the center. Then, a selfoc lens can perform optical property as same as optical lens. An image IM1, inputted to a selfoc lens, gives an erect imaging of IM2 at the opposite side of the selfoc lens inputting side.

A selfoc lens array is formed by bundling selfoc lenses orderly and gap between lenses is filled with absorbing layer like a black silicon and the end surface of the array is protected by reinforced plastic like a fiber reinforced plastic (FRP).

Figure 7A:
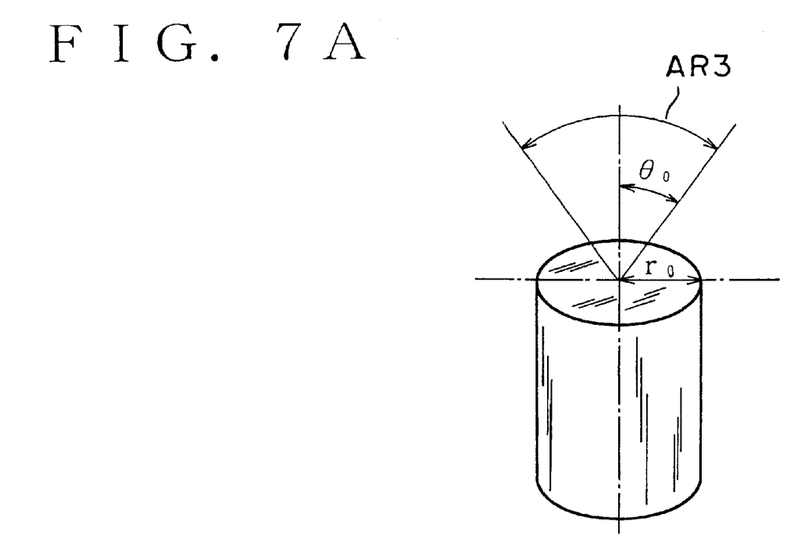
FIGS. 7A, 7B, 7C are drawings for explaining property of the selfoc lens in the third embodiment of a display unit for vehicles according to this invention.

Control of external light in a selfoc lens will be described with reference to FIG. 7A, 7B, 7C. The maximum incident angle (aperture angle) θ0 is defined by limited area wherein light can go through an optical fiber of a selfoc lens. Aperture angle θ0 is calculated by following equality.

$$\theta 0 = n0 \times R0 \times \sqrt{A}$$

n0: refractive index of lens
r0: distribution coefficient of refractive index
A: radius of lens Each optical fiber of selfoc lens has limited area AR3 for light passing through determined by its aperture angle θ0 as shown in FIG. 7A. Light inputted over this aperture angle can not go through the optical fiber and absorbed by absorbing layer as shown in FIG. 7B. Therefore, incident light on aperture angle area (shown by dot line) meanders in the optical fiber to be deflected toward higher refractive index area of the center and passes through it, but incident light over the aperture angle area (shown by solid line) can not be deflected enough and goes into absorbing layer AB and then it is absorbed by absorbing layer.

Figure 7B:
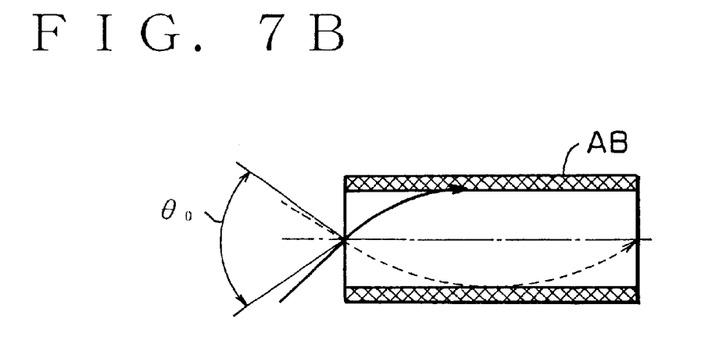
Figure 7C:
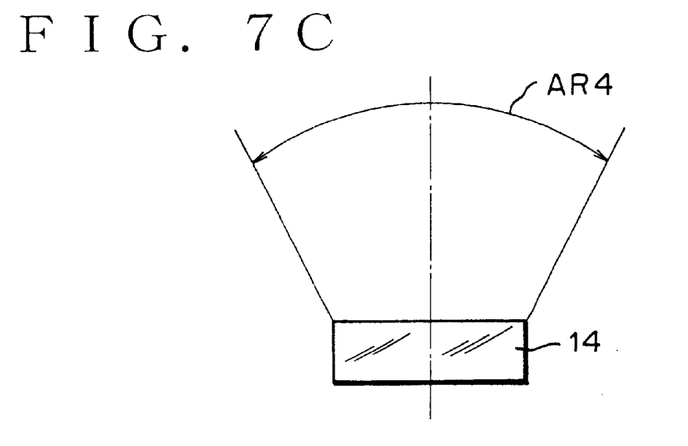

When selfoc lens is formed by bundling above optical fibers with such optical property, the selfoc lens can have area AR4 where light can pass through and other area where light can not pass through as shown in FIG. 7C. Adjusting the one side edge line of the boundary area to one end surface of the first polarizing plate 9 as shown in FIG. 3A, shading area by the first polarizing plate 9 and the second polarizing plate and shading area by light not-transmittable area of selfoc lens can be set for total external light control.

Further, function of the embodiment of a display unit for vehicles by using selfoc lens array for controlling external incident light according to this invention will be described as follows.

A displayed image on the liquid crystal display 12 is polarized and projected to be a normal image by the second polarizing plate 10 after passing the selfoc lens array 14. The projected light IM1 (image) by the second polarizing plate 10 through the selfoc lens array 14 is imaged on the whole surface of the second polarizing plate 10.

Figure 6:
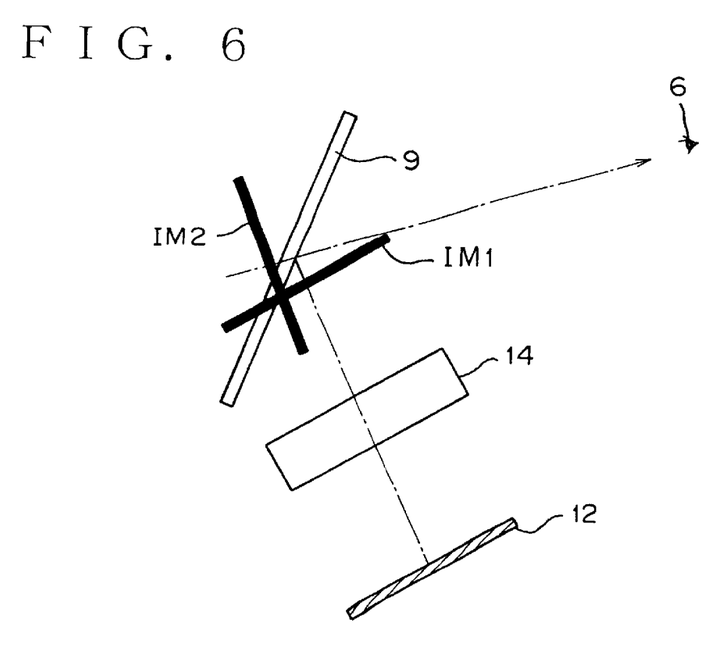
FIG. 6 is a drawing for explaining function of the selfoc lens in the third embodiment of a display unit for vehicles according to this invention.

This image IM1 is reflected toward the eye position 6 by the first polarizing plate 9 and when seeing the image from the eye position 6, the floating image IM2 can be seen in the air by see-through effect of the polarizing plate 9, as shown in FIG. 6.

Figure 3B:
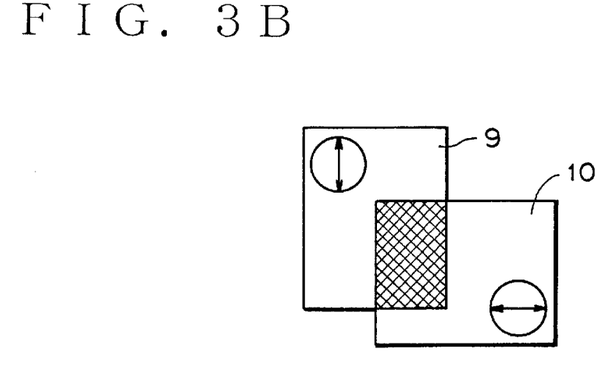

Furthermore, control of external incident light inside a car in this embodiment according to this invention will be described as follows In the area AR1 where external incident light is limited by the first polarizing plate 9, external light is polarized (vertical polarized light) through the first polarizing plate 9 as shown in FIG. 3B. When vertical polarized light goes into the liquid crystal display 12 through the selfoc lens array 14, the light is attenuated by the first polarizing plate 10 which polarizing direction is perpendicular to that of the light, near side of selfoc lens array.

In the area AR2 where external incident light is limited by the selfoc lens array 14, out of the area AR1 where external incident light is limited by the first polarizing plate 9, by means of adjusting the one side edge line of a boundary area AR4, where light can pass through the selfoc lens, to the top end surface of the first polarizing plate 9 as shown in FIG. 3A, external incident light over area AR4 can not pass through each optical fiber as shown in FIG. 7B and the light is absorbed by absorbing layer around each optical fiber and then light incident on the liquid crystal display 12 is prevented.

Figure 5A:
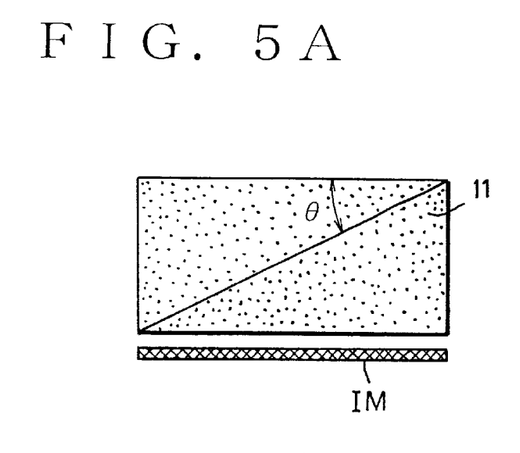
FIGS. 5A, 5B, 5C, 5D are drawings for explaining an effect of the selfoc lens in the third embodiment of a display unit for vehicles according to this invention.
Figure 5B:
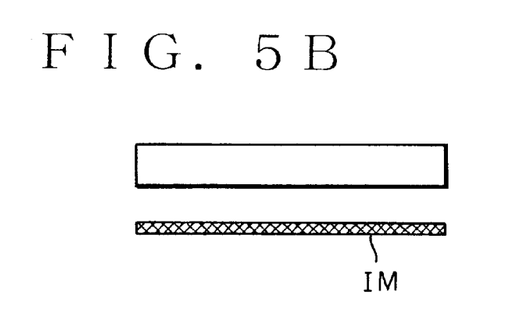
Figure 5C:
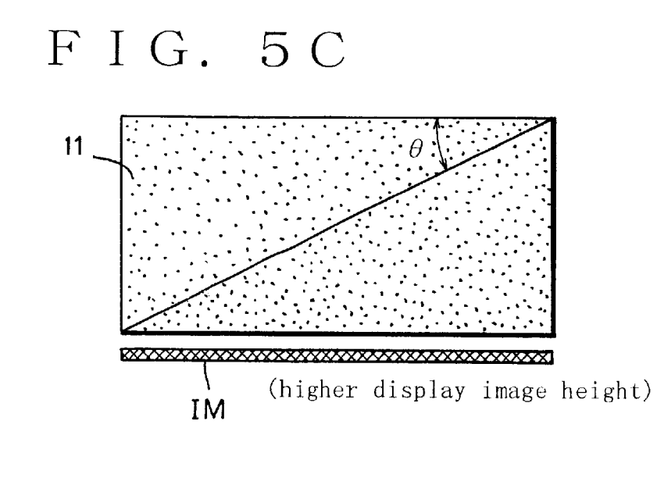

Using selfoc lens array 14 has an advantage on size in case of displaying a large size image, compared with using the prism 11. In case of displaying normal data of a car, a prism thickness shown in FIG. 5A is good enough. When displaying a graphic image like navigation data, higher image height is required. Then, the thickness of the prism 11 as shown in FIG. 5C is required thicker complying with an image height for the thickness of prism 11 as shown in FIG. 5A.

This reason is that a vertical angle of a prism is required to be a specific angle to prevent external incident light, when a prism is used to control external incident light. If a length of light incident surface of a prism is extended to adjust displaying image height with keeping the same thickness, the vertical angle θ of the prism will be smaller as following equality. Then, to keep the vertical angle θ of the prism in specific value regardless of increasing the length, the prism thickness has to be increased.

$$\tan \theta = A(\text{thickness})/B(\text{length})$$

Figure 5D:
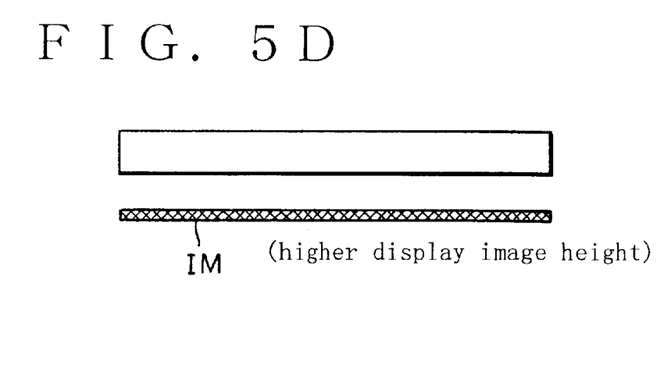

In case of selfoc lens, shading limit of external incident light is determined by the aperture angle of the selfoc lens array. Then, using the selfoc lens array 14 for higher displaying image height, the thickness of the lens array (shown in FIG. 5D) is not required to be thicker than the thickness of the lens array for normal displaying image height (shown in FIG. 5B). The area size of light incident surface of the lens array may be matched according to the displaying image height.

Thus, since the thickness of the selfoc lens array 14 is not increased dissimilarly to a prism for requiring higher displaying image height, a room factor can be minimized and a weight is also not increased much.

What is claimed is:

1. A display unit for vehicles comprising a display device, installed in a dashboard, for displaying information data, and a reflecting member placed under a windshield to make a driver recognize visually by reflecting a displayed image of the display device, wherein the reflecting member has a prism placed above the display device and a first polarizing means for reflecting the displayed image of the display device passed through the prism toward a direction of a driver's field of vision, wherein at least one of the display device or the prism has, on a surface thereof, a second polarizing means, a polarizing direction of which is perpendicular to that of the first polarizing means.

2. The display unit for vehicles according to claim 1, wherein the reflecting member has the second polarizing means on the surface of the display device.

3. The display unit for vehicles according to claim 1, wherein the reflecting member has the second polarizing means on the surface of the prism.

4. A display unit for vehicles comprising a display device, installed in a dashboard, for displaying information data and a reflecting member, placed under a windshield, to make a driver recognize visually by reflecting a displayed image of the display device, where in the reflecting member has a selfoc lens with prescribed limit incident angle placed over the display device, and a first polarizing means for reflecting the image of the display device, passed through the selfoc lens, toward a direction of a driver's field of vision, wherein the selfoc lens has, on a surface thereof, a second polarizing means a polarizing direction which is perpendicular to that of the first polarizing means.

5. The display unit for vehicles according to claim 4, wherein the limit incident angle area of the above selfoc lens can cover the reflecting field of the first polarizing means.

\* \* \* \* \*